United States Patent
Endou et al.

(10) Patent No.: US 10,234,843 B2
(45) Date of Patent: Mar. 19, 2019

(54) THERMAL DISPLACEMENT CORRECTION DEVICE FOR MACHINE TOOL

(71) Applicant: FANUC Corporation, Yamanashi (JP)

(72) Inventors: Takahiro Endou, Yamanashi (JP); Susumu Maekawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 337 days.

(21) Appl. No.: 14/680,569

(22) Filed: Apr. 7, 2015

(65) Prior Publication Data

US 2015/0286208 A1 Oct. 8, 2015

(30) Foreign Application Priority Data

Apr. 8, 2014 (JP) .................. 2014-079576

(51) Int. Cl.
*G05B 19/404* (2006.01)

(52) U.S. Cl.
CPC .. *G05B 19/404* (2013.01); *G05B 2219/14043* (2013.01); *G05B 2219/49219* (2013.01)

(58) Field of Classification Search
CPC ........ G05B 19/404; G05B 2219/14043; G05B 2219/49219
USPC .......................................................... 700/175
See application file for complete search history.

(56) References Cited

U.S. PATENT DOCUMENTS

| | | | |
|---|---|---|---|
| 5,619,414 A | 4/1997 | Ishii | |
| 6,089,750 A * | 7/2000 | Murakami | B23Q 17/24 374/101 |
| 7,695,188 B2 * | 4/2010 | Sri-Jayantha | G06F 1/206 374/110 |
| 2003/0065419 A1 | 4/2003 | Fujishima et al. | |
| 2012/0123586 A1 * | 5/2012 | Maekawa | G05B 19/404 700/173 |

(Continued)

FOREIGN PATENT DOCUMENTS

| CN | 101290266 A | 10/2008 |
|---|---|---|
| CN | 101436057 A | 5/2009 |

(Continued)

OTHER PUBLICATIONS

Office Action dated Sep. 29, 2015, corresponding to Japanese Patent Application No. 2014-079576.

(Continued)

*Primary Examiner* — Robert E Fennema
*Assistant Examiner* — Christopher W Carter
(74) *Attorney, Agent, or Firm* — Hauptman Ham, LLP

(57) ABSTRACT

A thermal displacement correction device for a machine tool that corrects thermal displacement of a spindle unit includes a memory that defines the spindle unit as a two-dimensional model in a thermally symmetrical plane or in a plane parallel to the thermally symmetrical plane, divides the two-dimensional model into regions, and stores a linear expansion coefficient, a heating coefficient and a radiation coefficient corresponding to each region, and a thermal conductivity coefficient between the each region and its adjacent region; a temperature estimating unit that estimates a temperature of the each region; a correction estimating unit; and a thermal displacement correction unit that performs correction in driving a feed shaft to a command position.

4 Claims, 8 Drawing Sheets

(56) References Cited

U.S. PATENT DOCUMENTS

2013/0028673 A1 * 1/2013 Onishi ............... B23Q 11/0007
    408/8

FOREIGN PATENT DOCUMENTS

| | | | | |
|---|---|---|---|---|
| CN | 101804581 A | 8/2010 | | |
| EP | 0687522 A1 * | 12/1995 | ............. | B23Q 15/18 |
| EP | 1170647 A2 * | 1/2002 | ........... | G05B 19/404 |
| JP | 7-299701 A | 11/1995 | | |
| JP | 2003-108206 A | 4/2003 | | |
| JP | 2006-65716 A | 3/2006 | | |
| JP | 2006-281420 A | 10/2006 | | |
| JP | 3887197 B2 | 2/2007 | | |
| JP | 2009-36669 A | 2/2009 | | |
| JP | 2011-45987 A | 3/2011 | | |
| JP | 2012-240137 A | 12/2012 | | |

OTHER PUBLICATIONS

Matsuda et al., "2D and 3D Finite Element Analysis of Continuous Steel-Concrete Composite Girder," Reports of the Faculty of Engineering, Nagasaki University, Japan, Jul. 2002, pp. 99-104, vol. 32, No. 59.

Itoh et al., "Simple Method to Predict Temperature Climatic Actions: Part 5 A Study on the Temperature of Basement RC Structure by FEM (Analysis Method)," Summaries of technical papers of Annual Meeting Architectural Institute of Japan (Kyushu) B-1, Japan, General Incorporated Association: Architectural Institute of Japan, Jul. 31, 2007, pp. 185-186.

Moriwaki et al., "Development of Modeling System for CAD/CAE of Machine Tools (2nd Report)—Application of Thermal Analysis for Moving Parts—," Journal of the Japan Society for Precision Engineering, 1994, pp. 959-963, vol. 60, No. 7.

Office Action in JP Application No. 2014-079576, dated Feb. 2, 2016.

* cited by examiner

THERMAL DISPLACEMENT CORRECTION DEVICE FOR MACHINE TOOL

RELATED APPLICATIONS

The present application claims priority to Japanese Application Number 2014-079576, filed Apr. 8, 2014, the disclosure of which is hereby incorporated by reference herein in its entirety.

BACKGROUND OF THE INVENTION

1. Field of the Invention

The present invention relates to a thermal displacement correction device for a machine tool and, more particularly, to a method of calculating a correction for thermal displacement of a spindle unit.

2. Description of the Related Art

A feed screw and a spindle of a machine tool are driven by motors so that heat generation of the motors, frictional heat generated by the rotation of bearings, and frictional heat of a coupling portion of a ball screw and a ball nut constituting the feed screw cause the feed screw and the spindle to expand and mechanical positions are displaced. That is, the relative position of a workpiece to be positioned and a tool is displaced. Variations in mechanical position due to heat are problematic in the case of high-precision machining.

Methods of estimating a displacement from various elements in order to remove the displacement are well known. JP 2003-108206 A discloses a correction device that establishes a three-dimensional model of a machine and estimates thermal displacement corrections from the operation and temperature of the machine. This correction device estimates a change in the temperature of micro-regions and estimates a thermal displacement correction from the temperature change estimated, thereby enabling an accurate correction. JP 2006-281420 A discloses a correction method for a NC machine tool that calculates a temperature distribution function based on temperature measurements at multiple points of a column and thereby calculates thermal displacement of a spindle unit.

The correction device described in JP 2003-108206 A is computationally complex due to a lot of computations so that it is not suitable to estimate the thermal displacement corrections varying from moment to moment. The correction method described in JP 2006-281420 A, which uses temperature sensors, increases the cost of a machine tool and can no longer perform accurate correction in failure of the temperature sensor.

SUMMARY OF THE INVENTION

An object of the present invention is to provide a thermal displacement correction device for a machine that can reduce computational load by defining a spindle unit as a two-dimensional model and compute a correction varying from moment to moment in smaller increments.

A thermal displacement correction device for a machine tool according to the present invention, which corrects thermal displacement of a spindle unit including a spindle, includes: a memory configured to define the spindle unit as a two-dimensional model in a thermally symmetrical plane or in a plane parallel to the thermally symmetrical plane, divide the two-dimensional model into regions, and store a linear expansion coefficient, a heating coefficient and a radiation coefficient corresponding to each region, and a thermal conductivity coefficient between the each region and its adjacent region; a temperature estimating unit that estimates a temperature of the each region; a correction estimating unit configured to estimate a correction based on the temperature estimated by the temperature estimating unit and the linear expansion coefficient corresponding to each region stored in the memory; and a thermal displacement correction unit configured to perform correction by adding the correction to a position command value for a feed shaft in driving the feed shaft to a command position.

The temperature estimating unit may estimate the temperature of each region based on the heating coefficient and the radiation coefficient corresponding to each region and the thermal conductivity coefficient between the each region and its adjacent region, stored in the memory.

The temperature estimating unit may include a spindle speed measuring unit configured to measure a spindle rotation speed, and estimate the temperature of each region based on the heating coefficient and the radiation coefficient corresponding to each region, the thermal conductivity coefficient between the each region and its adjacent region, which are stored in the memory, and the spindle rotation speed obtained by the spindle speed measuring unit.

The temperature estimating unit may include a temperature measuring unit configured to measure a temperature in at least one of the regions of the spindle unit, and estimate the temperature in the regions based on the heating coefficient and the radiation coefficient corresponding to each region, the thermal conductivity coefficient between the each region and its adjacent region, which are stored in the memory, and the temperature of the spindle unit obtained by the temperature measuring unit.

The temperature estimating unit may include a spindle speed measuring unit configured to measure a spindle rotation speed and a temperature measuring unit configured to measure a temperature in at least one of the regions of the spindle unit, and estimate the temperature in the regions based on the heating coefficient and the radiation coefficient corresponding to each region, the thermal conductivity coefficient between the each region and its adjacent region, which are stored in the memory, the spindle rotation speed obtained by the spindle speed measuring unit, and the temperature of the regions obtained by the temperature measuring unit.

The present invention thus constructed provides the thermal displacement correction device for the machine that can reduce computational load by defining the spindle unit as the two-dimensional model and compute the correction varying from moment to moment in smaller increments.

BRIEF DESCRIPTION OF THE DRAWINGS

The above and other objects and features of the invention will be apparent from the description of the embodiment below with reference to the accompanying drawings. These drawings are as follows.

DETAILED DESCRIPTION OF THE PREFERRED EMBODIMENTS

Figure 1:
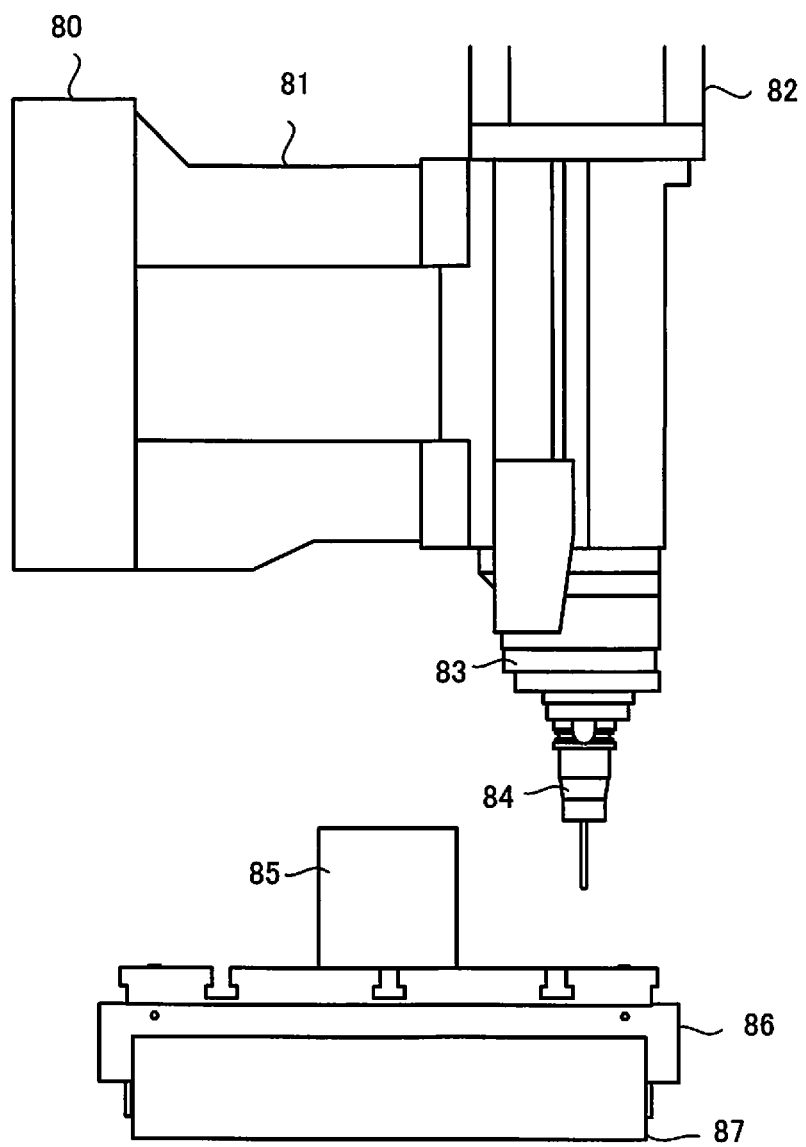
FIG. 1 illustrates part of a machine tool.

FIG. 1 illustrates part of a machine tool. A column 80 and a saddle 87 are fixed on a bed (not shown) of a machine tool. The side of the column 80 erected on the bed (not shown) is provided with a spindle mount 81. The spindle mount 81 is provided with a spindle 83 equipped with a spindle motor 82. The tool holder of the spindle 83 holds a tool 84. A workpiece 85 is secured to a table 86 on the saddle 87. The workpiece 85 is machined by the tool 84 held in the spindle 83.

In a machine tool as described above, a feed screw and a spindle as movable parts are driven by motors so that heat generation of the motors, frictional heat generated by the rotation of bearings, and frictional heat of a coupling portion of a ball screw and a ball nut constituting the feed screw cause the spindle and the feed screw to expand and mechanical positions are displaced.

A method of correcting thermal displacement in the present embodiment will now be described.

Let us consider a machine tool having the spindle 83 that is structurally and thermally symmetrical with respect to a plane including the rotational axis of the spindle 83 and an axis perpendicular to the rotational axis of the spindle 83. In this case, since heat is transmitted equally in the direction of the axis perpendicular to a symmetry plane, thermal displacements are also symmetrical with respect to the symmetry plane. When focusing on the rotational axis of the spindle 83, the thermal displacements therefore cancel each other in the direction of the axis perpendicular to the symmetry plane and this allows no thermal displacements to be considered as generated.

Defining a spindle unit as a two-dimensional model excluding the axis perpendicular to the symmetry plane can further simplify the calculation of a correction of the spindle unit. The temperature change in each region is calculated considering a temperature of a spindle motor, heat radiation, heat generation caused by the acceleration and deceleration of the machine, and thermal conduction between the each region and its adjacent regions. The correction can be estimated from these carefully selected elements.

In the following description, a plane including the rotational axis of the spindle parallel to the Z-axis and the Y-axis is defined as the symmetry plane, and a case of a vertical machining center including a spindle unit having a symmetrical structure with respect to the symmetry plane is described.

1. Setting Up Spindle Unit Model

Figure 2:
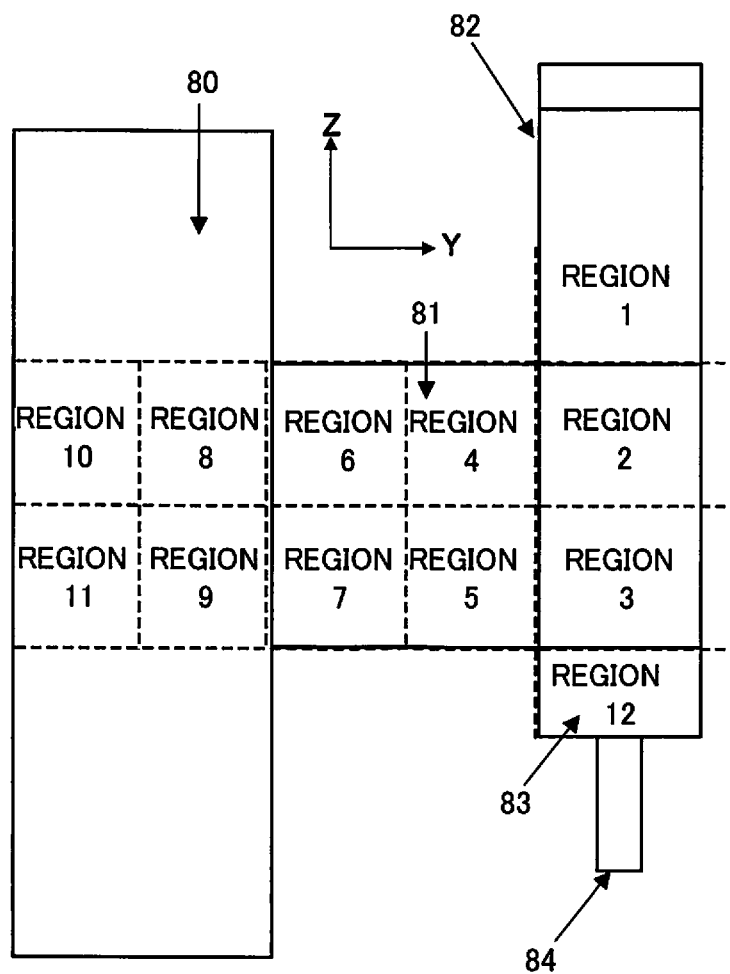
FIG. 2 illustrates a plurality of regions into which a spindle unit is divided.

The spindle unit including the spindle is regarded as a two-dimensional model on the Y-Z plane such as shown in FIG. 2.

This model is divided into 12 regions and a space for storing a temperature in each of the regions is reserved in a memory of a controller (see FIG. 10), where a temperature of region I at time N is referred to as $T_{IN}$. While this exemplary model is divided into 12 regions starting from region 1 to 12 as shown in FIG. 2, any number and size of regions may be used. The spindle unit is comprised of the spindle 83, the spindle motor 82, the spindle mount 81, and the column 80 as shown in FIG. 2, but is not limited thereto. An appropriate radiation coefficient, heating coefficient, and thermal conductivity coefficient between each region and its adjacent regions are determined based on the number, shape, and size of the regions set. These coefficients are stored in the memory of the controller. Temperature $T_{I0}$ of each region at the time of cold start is stored in the memory.

Figure 3:
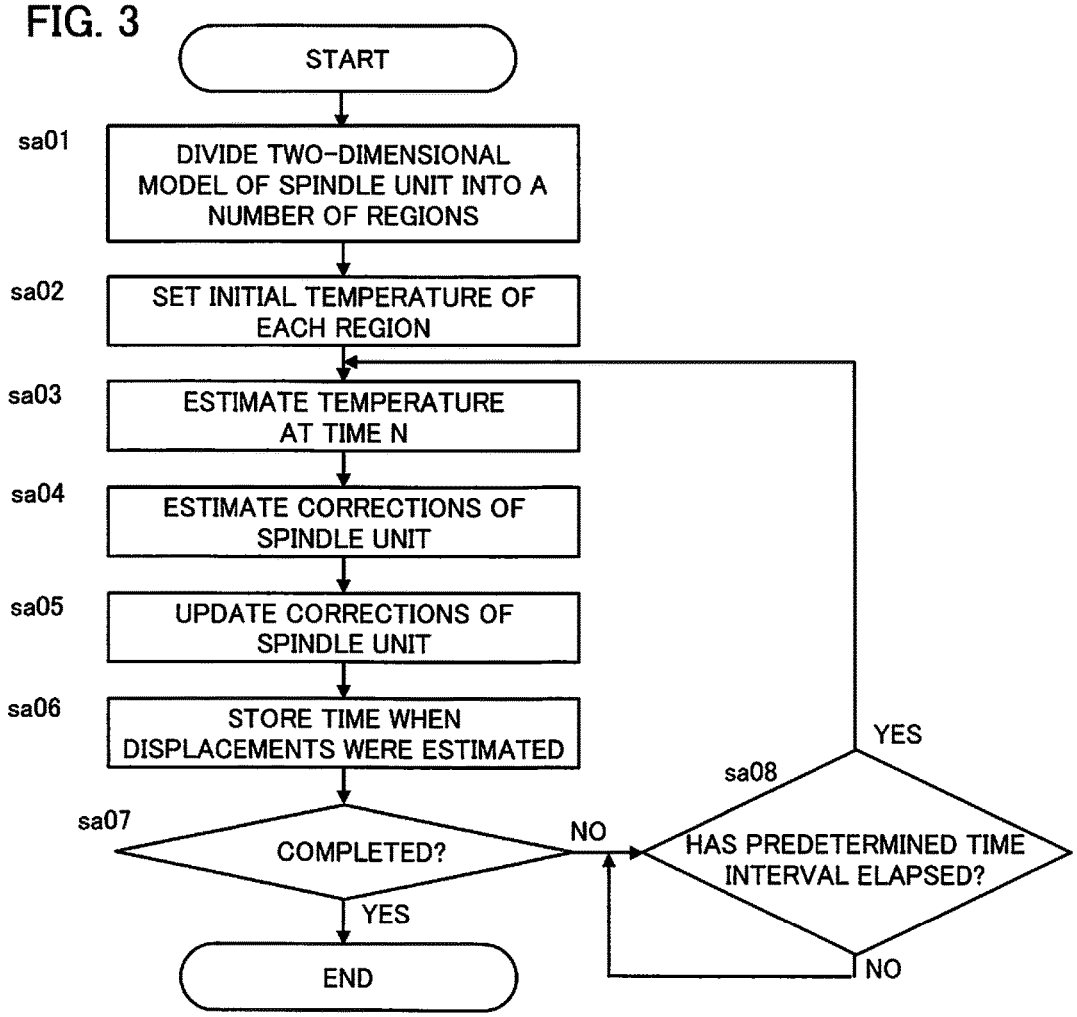
FIG. 3 is a flow chart showing a process for a method of correcting thermal displacement.

FIG. 3 is a flow chart showing a process for a method of correcting thermal displacement.

(Step sa01)
Divide two-dimensional model of spindle unit into a number of regions.

(Step sa02)
Set initial temperature of each region.

(Step sa03)
Estimate temperature at time N.

(Step sa04)
Estimate corrections of spindle unit.

(Step sa05)
Update corrections of spindle unit.

(Step sa06)
Store time when displacements were estimated.

(Step sa07)
Determine whether process is completed.

(Step sa08)
Determine whether a predetermined time interval has elapsed and proceed to step sa03 when the predetermined time has elapsed.

2. Storing Initial Value of Temperature of Each Region

An initial value of the temperature of each region is calculated and stored in the memory of the controller.

A time when the last temperature distribution was calculated and the temperature of each region at the time are read from the memory of the controller.

The current time is read.

Using a method of estimating a temperature distribution described in paragraph 3, the temperature distribution is estimated at predetermined time intervals from the time when the last temperature distribution was calculated and the temperature distribution at the current time is estimated.

Calculated results are stored in the memory of the controller.

3. Estimating Temperature of Each Region

Figure 4:
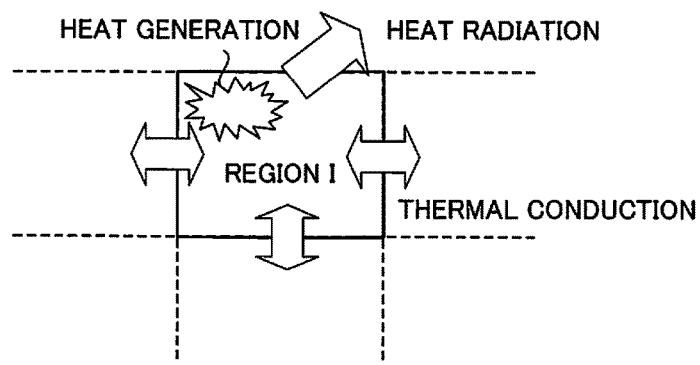
FIG. 4 illustrates an image of thermal conduction.

FIG. 4 schematically illustrates heat generation, heat radiation, and thermal conduction of each of the regions divided. Three elements (i.e., temperature changes due to heat radiation of each region, heat generation of each region, and thermal conduction between the each region and its adjacent regions) shown in FIG. 4 are estimated and thus the temperature at the current time is estimated.

Figure 5:
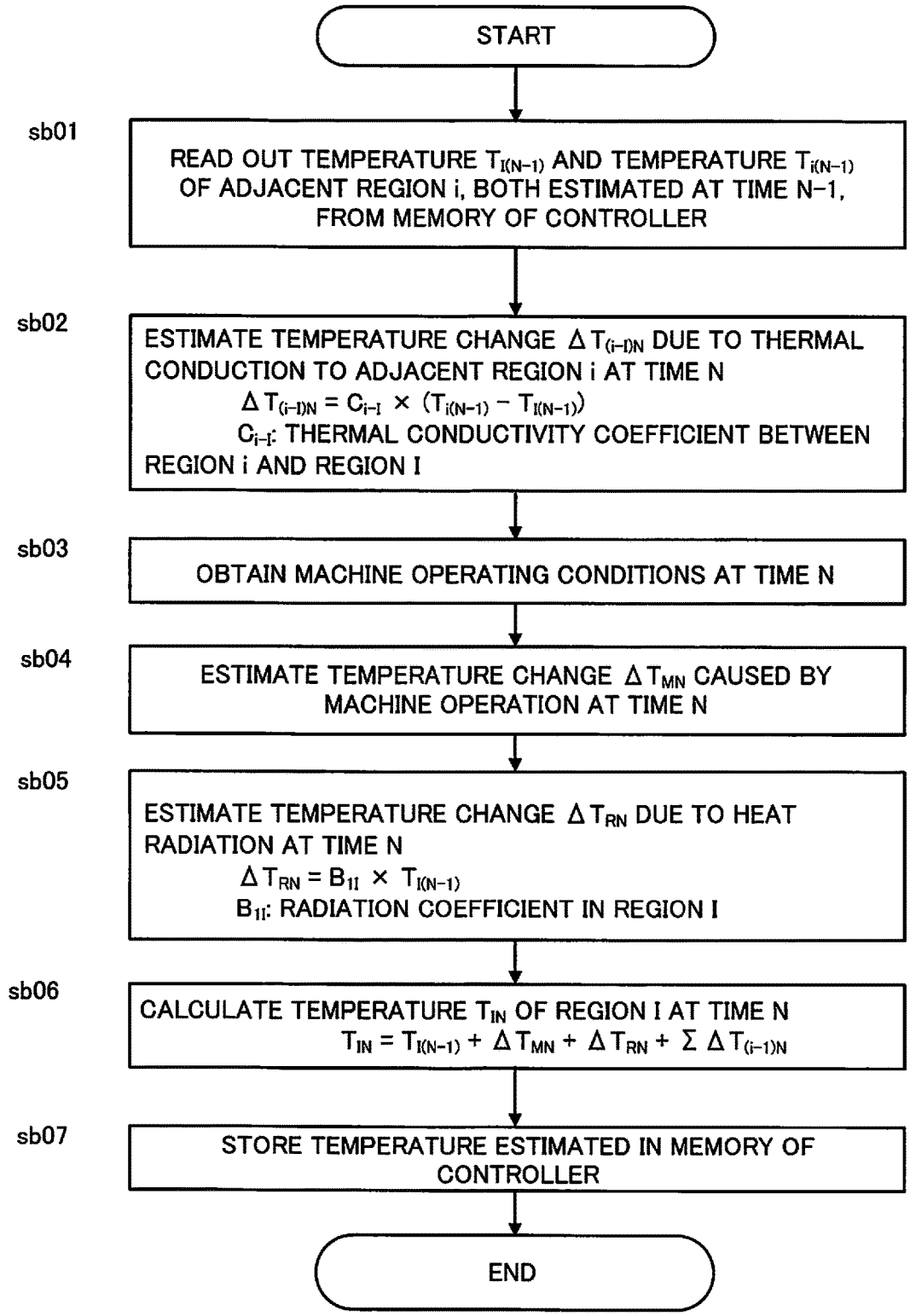
FIG. 5 is a flow chart showing a process for a method of estimating a temperature in region I at time N.

A method of estimating a temperature $T_{IN}$ of region I at time N will now be described with reference to a flowchart shown in FIG. 5.

(Step sb01)
A temperature $T_{I(N-1)}$ of region I and a temperature $T_{i(N-1)}$ of region i adjacent to region I, both estimated at time N−1, are read out from the memory of the controller.

(Step sb02)
A temperature change $\Delta T_{(i-I)N}$ due to thermal conduction to the adjacent region i at time N is estimated based on the following equation.

$$\Delta T_{(i-I)N} = C_{i-I} \times (T_{i(N-1)} - T_{1(N-1)})$$

$C_{i\text{-}I}$: thermal conductivity coefficient between region i and region I
(Step sb03)
Machine operating conditions at time N, i.e., a spindle rotation speed $S_N$, a load $Lm_N$ of the spindle motor, and a moving speed $v_N$ of the spindle unit are then obtained in order to estimate a change in the temperature of region I caused by machine operation.
(Step sb04)
A temperature change $\Delta T_{MN}$ caused by the machine operation at time N is estimated. In the following description, $\Delta T_{SP}$, $\Delta T_{LM}$, and $\Delta T_v$ are calculated as the temperature change $\Delta T_{MN}$ caused by the machine operation.
A temperature change $\Delta T_{SPN}$ caused by spindle rotation at time N is estimated from the spindle rotation speed $S_N$ using the following equation.

$$\Delta T_{SPN} = A_{SPI} \times S_N + B_{2I} \times S_N \times T_{I(N-1)}$$

$A_{SPI}$: heating coefficient caused by spindle rotation in region I
$B_{2I}$: radiation coefficient caused by spindle rotation in region I
A temperature change $\Delta T_{LMN}$ caused by the operation of the spindle motor is estimated from the load $Lm_N$ of the spindle motor using the following equation.

$$\Delta T_{LMN} = A_{LMI} \times Lm_N$$

$A_{LMI}$: heating coefficient caused by operation of spindle motor in region I
A temperature change $\Delta T_{VN}$ caused by the movement of the spindle unit is estimated from the moving speed $v_N$ of the spindle unit.

$$\Delta T_{VN} = A_V \times v_N + B_V \times v_N \times T_{I(N-1)}$$

$A_V$: heating coefficient of spindle unit caused by its movement
$B_V$: radiation coefficient of spindle unit caused by its movement
The temperature change $\Delta T_{MN}$ caused by the machine operation at time N is estimated based on the following equation.

$$\Delta T_{MN} = \Delta T_{SPN} + \Delta T_{LMN} + \Delta T_{vN}$$

While the spindle rotation, the operation of the spindle motor, and the movement of the spindle unit are given here as an example of the machine operation that affects the change in the temperature of the spindle unit, these factors are increased or decreased depending on the configuration of the machine.
These equations may be modified according to the type of bearing and the shape of the spindle.
(Step sb05)
A temperature change $\Delta T_{RN}$ due to heat radiation at time N is estimated based on the following equation.

$$\Delta T_{RN} = B_{1I} \times T_{I(N-1)}$$

$B_{1I}$: radiation coefficient in region I
(Step sb06)
A temperature $T_{IN}$ of region I at time N is estimated from the temperature change calculated above.

$$T_{IN} = T_{I(N-1)} + \Delta T_{MN} + \Delta T_{RN} + \Sigma \Delta T_{(i\text{-}I)N}$$

(Step sb07)
The temperature $T_{IN}$ calculated is stored in the memory of the controller and the process is completed.

4. Estimating Corrections in Y-Axis and Z-Axis Directions from Temperature

Figure 6:
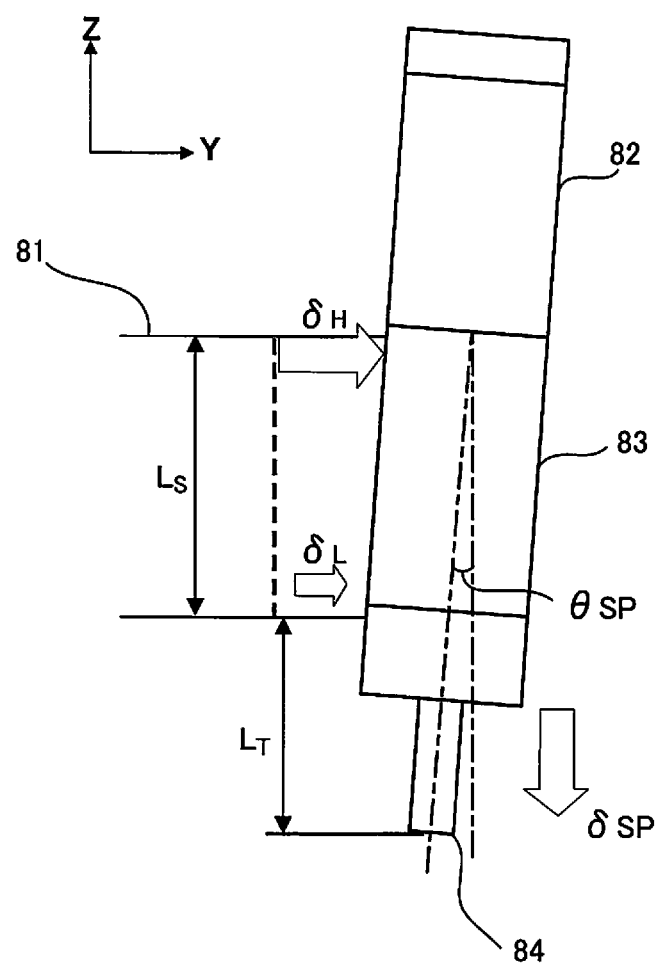
FIG. 6 illustrates thermal deformation of the spindle unit schematically.
Figure 7:
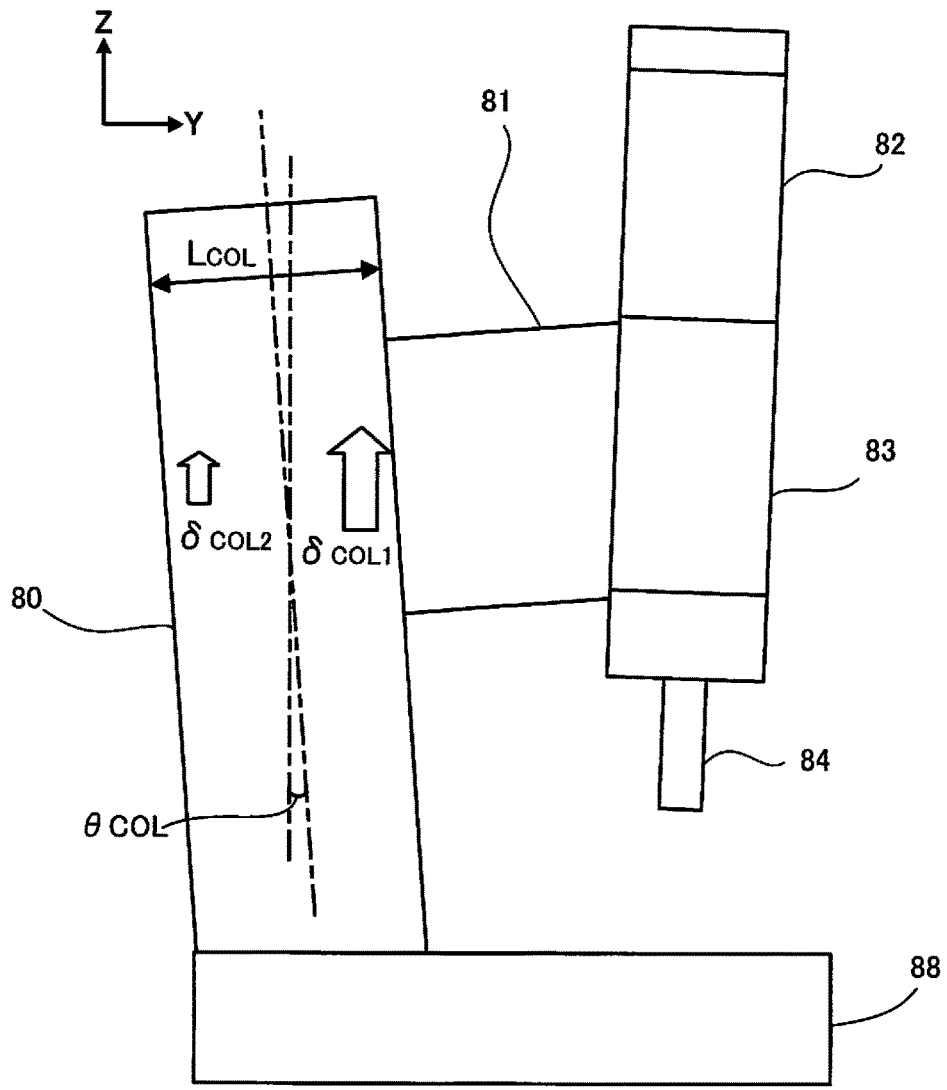
FIG. 7 illustrates thermal deformation of a column unit schematically.
Figure 8:
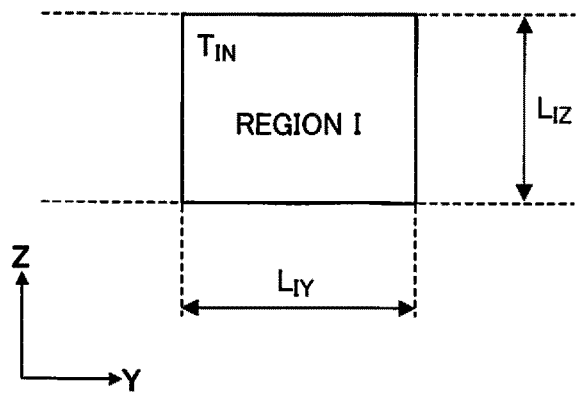
FIG. 8 illustrates region I schematically.

FIG. 6, showing a model of the spindle unit on the Y-Z plane, schematically illustrates thermal displacements in the Y-axis and Z-axis directions of the spindle unit during machine operation. FIG. 7 schematically illustrates thermal deformation of a column unit during the machine operation and, in addition, FIG. 8 illustrates region I schematically. A bed is denoted by reference numeral 88.

The following parameters are estimated using the temperature of each region estimated in paragraph 3 above: thermal displacement $\delta_H$ in the Y-axis direction at the higher portion of the spindle mount, thermal displacement $\delta_L$ in the Y-axis direction at the lower portion of the spindle mount, thermal displacement $\delta_{SP}$ in the Z-axis direction of the spindle, thermal displacement $\delta_{COL1}$ of the column at a point near the spindle mount, thermal displacement $\delta_{COL2}$ of the column at a point away from the spindle mount, slope $\theta_{SP}$ of the spindle unit, slope $\theta_{COL}$ of the column, correction $\delta_Y$ in the Y-axis direction, and correction $\delta_Z$ in the Z-axis direction.

Figure 9:
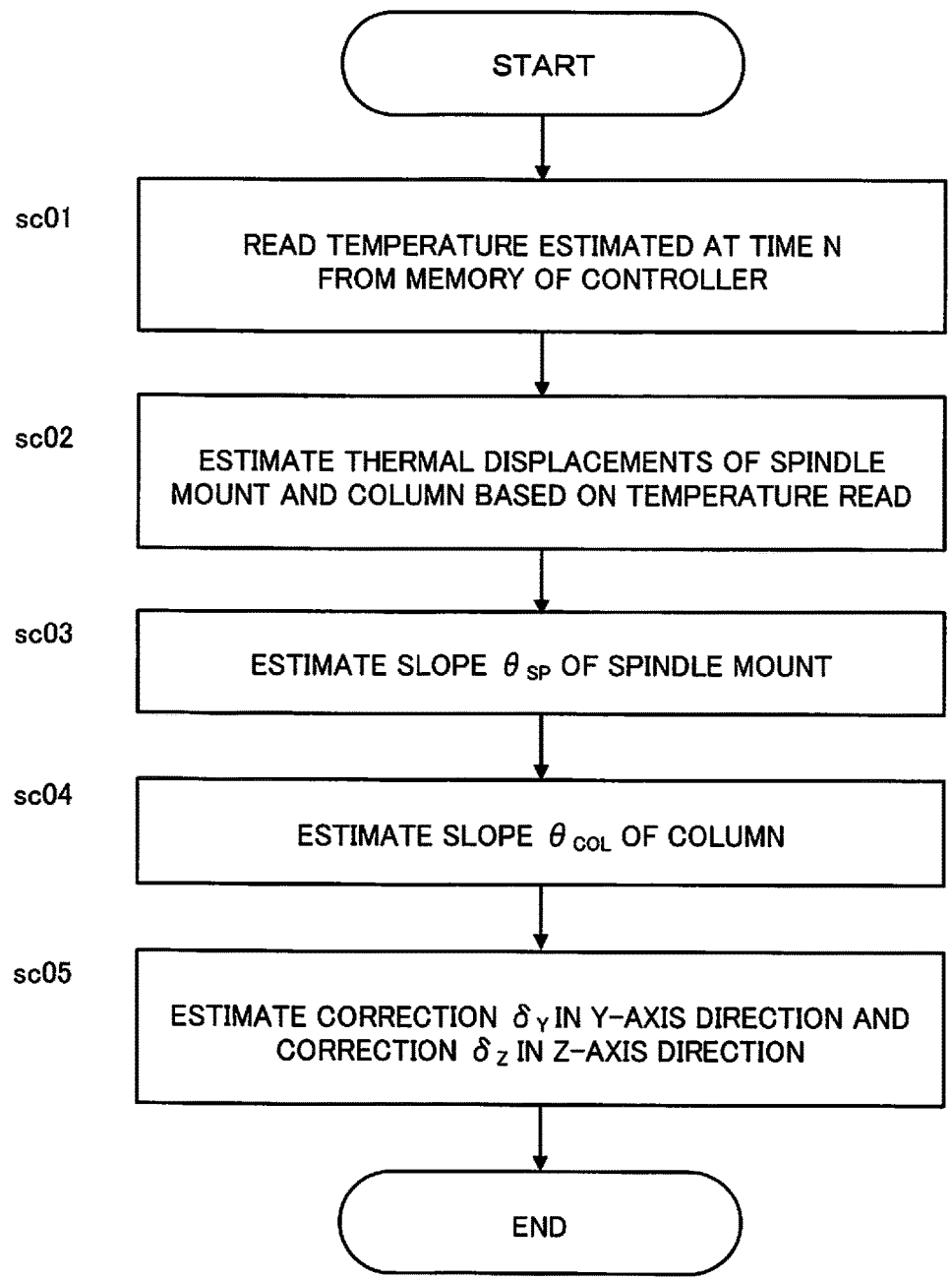
FIG. 9 is a flow chart showing a process for a method of estimating thermal displacements in the Y-axis and Z-axis directions at time N.

FIG. 9 is a flow chart showing a process for a method of estimating corrections in the Y-axis and Z-axis directions at time N. Description is made below with reference to the following steps.
(Step sc01)
The temperature estimated at time N is read from the memory of the controller. In other words, the temperature of the spindle unit in the regions estimated in paragraph 3 is read from the memory of the controller.
(Step sc02)
The thermal displacements of the spindle mount and the column are estimated based on the temperature read.
Thermal displacement $\delta_H$ in the Y-axis direction at the higher portion of the spindle mount, thermal displacement $\delta_L$ in the Y-axis direction at the lower portion of the spindle mount, thermal displacement $\delta_{SP}$ in the Z-axis direction of the spindle, thermal displacement $\delta_{COL1}$ of the column at a point near the spindle mount, and thermal displacement $\delta_{COL2}$ of the column at a point away from the spindle mount are estimated based on the general equation of thermal expansion.
Thermal displacement $\delta_H$ (region I: 4, 6) in the Y-axis direction at the higher portion of the spindle mount is calculated as follows:

$$\delta_H = \Sigma(\alpha \times L_{IY} \times (T_{IN} - T_{I0}))$$

$\alpha$: linear expansion coefficient
$L_{IY}$: length of region I in Y-axis direction
$T_{IN}$: temperature of region I at time N
$T_{I0}$: temperature of region I at the time of cold start
Thermal displacement $\delta_L$ (region I: 5, 7) in the Y-axis direction at the lower portion of the spindle mount is calculated as follows:

$$\delta_L = \Sigma(\alpha \times L_{IY} \times (T_{IN} - T_{I0}))$$

$\alpha$: linear expansion coefficient
$L_{IY}$: length of region I in Y-axis direction
$T_{IN}$: temperature of region I at time N
$T_{I0}$: temperature of region I at the time of cold start
Thermal displacement $\delta_{SP}$ (region I: 1, 2, 3, 12) in the Z-axis direction of the spindle is calculated as follows:

$$\delta_{SP} = \Sigma(\alpha \times L_{IZ} \times (T_{IN} - T_{I0}))$$

$\alpha$: linear expansion coefficient
$L_{IZ}$: length of region I in Z-axis direction
$T_{IN}$: temperature of region I at time N
$T_{I0}$: temperature of region I at the time of cold start Thermal displacement $\delta_{COL1}$ (region I: 8, 9) on the heat source side of the column is calculated as follows:

$$\delta_{COL1}=\Sigma(\alpha \times L_{IZ} \times (T_{IN}-T_{I0}))$$

α: linear expansion coefficient
$L_{IZ}$: length of region I in Z-axis direction
$T_{IN}$: temperature of region I at time N
$T_{I0}$: temperature of region I at the time of cold start Thermal displacement $\delta_{COL2}$ (region I: 10, 11) of the column is calculated as follows:

$$\delta_{COL2}=\Sigma(\alpha \times L_{IZ} \times (T_{IN}-T_{I0}))$$

α: linear expansion coefficient
$L_{IZ}$: length of region I in Z-axis direction
$T_{IN}$: temperature of region I at time N
$T_{I0}$: temperature of region I at the time of cold start (Step sc03)

Slope $\theta_{SP}$ of the spindle mount (equal to slope $\theta_{SP}$ of the spindle unit) is estimated from the thermal displacements calculated above, using the following equation.

$$\theta_{SP}=\tan^{-1}((\delta_H-\delta_L/L_S)$$

(Step sc04)

Slope $\theta_{COL}$ of the column is estimated from the thermal displacements calculated above, using the following equation.

$$\theta_{COL}=\tan^{-1}((\delta_{COL1}-\delta_{COL2})/L_{COL})$$

(Step sc05)

Correction $\delta_Y$ in the Y-axis direction is estimated based on the following equation, where a distance between the bottom portion of the spindle unit and a tool tip is $L_T$.

$$\delta_Y=\delta_L+L_T\times\sin(\theta_{SP}+\theta_{COL})$$

Correction $\delta_Z$ in the Z-axis direction is estimated based on the following equation.

$$\delta_Z=\delta_{COL1}+\delta_{SP}+L_T\times\sin\delta_{COL}$$

5. Updating Corrections

Updating is performed using the corrections estimated in paragraph 4 above.

6. Storing Time when Corrections were Estimated

Time N when the corrections were estimated is stored in the memory of the controller.

7. Repeating from paragraph 3 to 6 at predetermined time interval

Figure 10:
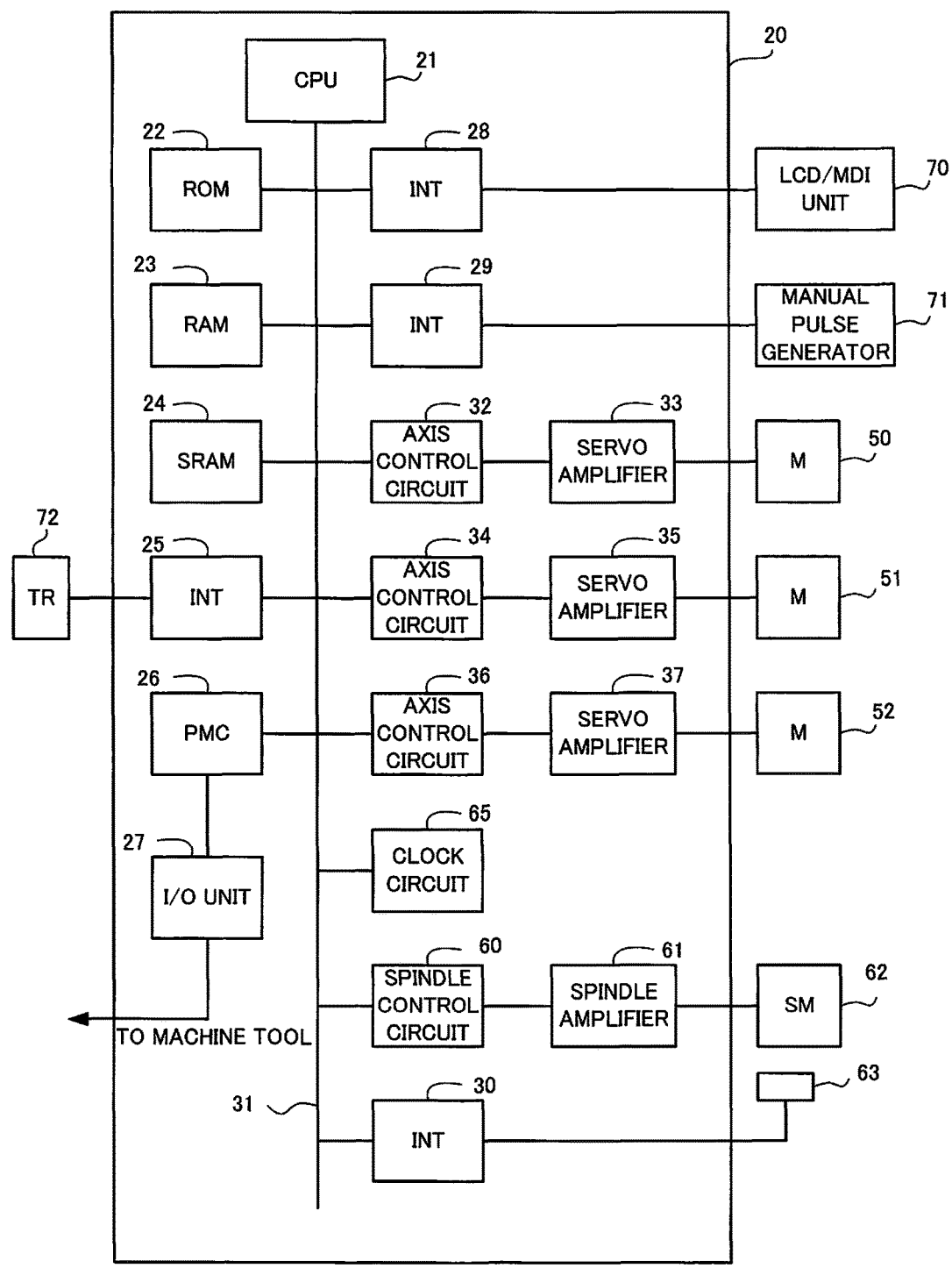
FIG. 10 is a block diagram showing part of a numerical control unit for controlling the machine tool.

FIG. 10 is a block diagram showing part of a numerical control unit of the machine tool.

A numerical control unit 20 can provide a thermal displacement correction device for the machine tool described above. A processor (CPU) 21 of the numerical control unit 20 for controlling the machine tool provides overall control of the numerical control unit 20. The processor 21 reads a system program stored in a ROM 22 through a bus 31 and provides overall control of the numerical control unit 20 in accordance with the system program. A RAM 23 stores data such as temporary calculation data, display data, and various data that are input through an LCD/MDI unit 70 by an operator.

A SRAM 24, which is backed up by a battery (not shown), is configured as a non-volatile memory that retains its memory state even when the power of the numerical control unit 20 is turned off. The SRAM 24 stores programs such as a program for measuring an initial position, a program for correcting the thermal displacements of the machine tool, a machining program, described below, installed via an interface 25, and a machining program input through the LCD/MDI unit 70. The ROM 22 is provided in advance with various system programs that perform processing for an edit mode required for creating and editing a machining program and processing for automatic operation.

An interface 25 is used for interfacing with external devices capable of being connected to the numerical control unit 20, and an external device 72 such as an external storage device is connected to the interface 25. A machining program, a program for measuring the thermal displacements, and other programs are installed from the external storage device. A programmable machine controller (PMC) 26 controls auxiliary equipment etc. of the machine tool using sequence programs that are built in the numerical control unit 20. That is, the sequence programs convert to signals necessary for the auxiliary equipment according to M-function, S-function, and T-function commanded by the machining program and output the signals from an I/O unit 27 to the auxiliary equipment. The output signals activate the auxiliary equipment such as actuators. The PMC 26 also receives signals from various switches etc. of an operation panel mounted on a machine tool body and sends the signals to the processor 21 after necessary processing.

The LCD/MDI unit 70 receives current positions of the axes, alarms, parameters, and image signals such as image data in the machine tool and displays them on its display. The LCD/MDI unit 70 is a manual data entry device with a display, keyboard, etc., and an interface 28 passes data received from the keyboard of the LCD/MDI unit 70 to the processor 21.

An interface 29 is connected to a manual pulse generator 71. The manual pulse generator 71 is mounted on the operation panel of the machine tool and is used for accurately positioning movable parts of the machine tool by controlling the axes using distributed pulses through manual operation. The bus is denoted by reference numeral 31. Control circuits 32, 34, 36 for the X-axis, Y-axis, Z-axis, respectively, which move the table T of the machine tool, receive drive commands for the axes from the processor 21 and outputs the commands for the axes to servo amplifiers 33, 35, 37, respectively. In response to the commands, the servo amplifiers 33, 35, 37, drive servo motors 50 to 52 for the axes of the machine tool, respectively. The servo motors 50 to 52 for the axes have a built-in pulse coder for position detection, and a position signal from the pulse coder is fed back as a pulse train.

A spindle control circuit 60 receives a spindle rotation command for the machine tool and outputs a spindle speed signal to a spindle amplifier 61. In response to the spindle speed signal, the spindle amplifier 61 rotates a spindle motor (main spindle motor) 62 of the machine tool at the commanded rotational speed to drive the tool. A position coder 63, which is connected to the spindle motor (main spindle motor) 62 through a gear, belt, or the like, outputs a feedback pulse in synchronization with the rotation of the spindle. The feedback pulse is input to the processor 21 via an interface 30. A clock circuit is denoted by reference numeral 65, which is adjusted to synchronize with the current time.

The configuration described above provides a thermal displacement correction device for a machine that can reduce computation time required for the estimation in order to correct, in real time, the thermal displacement varying from moment to moment and correct the thermal displacement with a small number of sensors in order to reduce the cost of the machine and improve its reliability.

The invention claimed is:

1. A thermal displacement correction device for correcting thermal displacement of a spindle device in a machine tool, the spindle device including a spindle, a column for supporting the spindle, and a spindle mount connecting the spindle to the column, the thermal displacement correction device comprising:
- a memory which
  - stores a two-dimensional model of the spindle device in a thermally symmetrical plane or in a plane parallel to the thermally symmetrical plane, wherein the two-dimensional model is divided into regions arranged in an array with multiple rows and multiple columns, and
  - stores a linear expansion coefficient, a heating coefficient and a radiation coefficient corresponding to each region, and a thermal conductivity coefficient between each region and its adjacent region;
- a temperature estimating controller which estimates the temperature of each region based on the heating coefficient and the radiation coefficient corresponding to each region and the thermal conductivity coefficient between each region and its adjacent region, stored in the memory; and
- a correction estimating controller which estimates a correction of the thermal displacement of the spindle device, based on the temperature estimated by the temperature estimating controller and the linear expansion coefficient corresponding to each region stored in the memory, by
  - estimating a first slope of the spindle mount,
  - estimating a second slope of the column supporting the spindle, and
  - estimating the correction, using both the first slope of the spindle mount and the second slope of the column supporting the spindle,
- wherein the thermal displacement correction device performs correction by adding the correction to a position command value for a feed shaft in driving the feed shaft to a command position.

2. A thermal displacement correction device for correcting thermal displacement of a spindle device in a machine tool, the spindle device including a spindle, a column for supporting the spindle, and a spindle mount connecting the spindle to the column, the thermal displacement correction device comprising:
- a memory which
  - stores a two-dimensional model of the spindle device in a thermally symmetrical plane or in a plane parallel to the thermally symmetrical plane, wherein the two-dimensional model is divided into regions arranged in an array with multiple rows and multiple columns, and
  - stores a linear expansion coefficient, a heating coefficient and a radiation coefficient corresponding to each region, and a thermal conductivity coefficient between each region and its adjacent region;
- a temperature estimating controller that comprises a spindle speed measuring device to measure a spindle rotation speed of the spindle, and estimates the temperature of each region based on
  - the heating coefficient and the radiation coefficient corresponding to each region, the thermal conductivity coefficient between each region and its adjacent region, stored in the memory, and
  - the spindle rotation speed obtained by the spindle speed measuring device;
- a correction estimating controller which estimates a correction of the thermal displacement of the spindle device, based on the temperature estimated by the temperature estimating controller and the linear expansion coefficient corresponding to each region stored in the memory, by
  - estimating a first slope of the spindle mount,
  - estimating a second slope of the column supporting the spindle, and
  - estimating the correction, using both the first slope of the spindle mount and the second slope of the column supporting the spindle,
- wherein the thermal displacement correction device performs correction by adding the correction to a position command value for a feed shaft in driving the feed shaft to a command position.

3. A thermal displacement correction device for correcting thermal displacement of a spindle device in a machine tool, the spindle device including a spindle, a column for supporting the spindle, and a spindle mount connecting the spindle to the column, the thermal displacement correction device comprising:
- a memory which
  - stores a two-dimensional model of the spindle device in a thermally symmetrical plane or in a plane parallel to the thermally symmetrical plane, wherein the two-dimensional model is divided into regions arranged in an array with multiple rows and multiple columns, and
  - stores a linear expansion coefficient, a heating coefficient and a radiation coefficient corresponding to each region, and a thermal conductivity coefficient between each region and its adjacent region;
- a temperature estimating controller that comprises a temperature measuring device to measure the temperature in at least one of the regions of the spindle device, and estimates the temperature in the regions based on
  - the heating coefficient and the radiation coefficient corresponding to each region, the thermal conductivity coefficient between each region and its adjacent region, stored in the memory, and
  - the temperature of the spindle device obtained by the temperature measuring device; and
- a correction estimating controller which estimates a correction of the thermal displacement of the spindle device, based on the temperature estimated by the temperature estimating controller and the linear expansion coefficient corresponding to each region stored in the memory, by
  - estimating a first slope of the spindle mount,
  - estimating a second slope of the column supporting the spindle, and
  - estimating the correction, using both the first slope of the spindle mount and the second slope of the column supporting the spindle,
- wherein the thermal displacement correction device performs correction by adding the correction to a position command value for a feed shaft in driving the feed shaft to a command position.

4. A thermal displacement correction device for correcting thermal displacement of a spindle device in a machine tool, the spindle device including a spindle, a column for supporting the spindle, and a spindle mount connecting the spindle to the column, the thermal displacement correction device comprising:
- a memory which
  - stores a two-dimensional model of the spindle device in a thermally symmetrical plane or in a plane parallel to the thermally symmetrical plane, wherein the two-dimensional model is divided into regions arranged in an array with multiple rows and multiple columns, and stores a linear expansion coefficient, a heating coefficient and a radiation coefficient corresponding to each region, and a thermal conductivity coefficient between each region and its adjacent region;

a temperature estimating controller that comprises a spindle speed measuring device to measure a spindle rotation speed of the spindle and a temperature measuring device to measure the temperature in at least one of the regions of the spindle device, and estimates the temperature in the regions based on the heating coefficient and the radiation coefficient corresponding to each region, the thermal conductivity coefficient between each region and its adjacent region, stored in the memory, the spindle rotation speed obtained by the spindle speed measuring device, and the temperature of the regions obtained by the temperature measuring device; and a correction estimating controller which estimates a correction of the thermal displacement of the spindle device, based on the temperature estimated by the temperature estimating controller and the linear expansion coefficient corresponding to each region stored in the memory, by estimating a first slope of the spindle mount, estimating a second slope of the column supporting the spindle, and estimating the correction, using both the first slope of the spindle mount and the second slope of the column supporting the spindle, wherein the thermal displacement correction device performs correction by adding the correction to a position command value for a feed shaft in driving the feed shaft to a command position.

* * * * *